(12) United States Patent
Gehman et al.

(10) Patent No.: US 7,249,503 B2
(45) Date of Patent: Jul. 31, 2007

(54) TUBE AND DIE INTERFACE FOR LIQUID FLOW SENSING THROUGH THE TUBE

(75) Inventors: Richard W. Gehman, Freeport, IL (US); James ZT Liu, Rockford, IL (US); Michael G. Marchini, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 74 days.

(21) Appl. No.: 11/185,035

(22) Filed: Jul. 20, 2005

(65) Prior Publication Data

US 2007/0017286 A1    Jan. 25, 2007

(51) Int. Cl.
*G01F 1/68*    (2006.01)
(52) U.S. Cl. .................................. 73/204.27
(58) Field of Classification Search ............. 73/204.27, 73/204.26
See application file for complete search history.

(56) References Cited

U.S. PATENT DOCUMENTS

| | | | |
|---|---|---|---|
| 4,333,354 A | 6/1982 | Feller | 73/861.77 |
| 4,358,947 A | 11/1982 | Greene et al. | 73/3 |
| 4,399,696 A * | 8/1983 | Feller | 73/195 |
| 4,559,483 A * | 12/1985 | Jundt et al. | 388/833 |
| 4,612,806 A * | 9/1986 | Feller | 73/195 |
| 4,649,756 A | 3/1987 | Feller | 73/861.83 |
| 4,890,499 A | 1/1990 | Feller | 73/861.05 |
| 2002/0073772 A1 | 6/2002 | Bonne et al. | 73/204.11 |

* cited by examiner

*Primary Examiner*—Edward Lefkowitz
*Assistant Examiner*—Andre Allen
(74) *Attorney, Agent, or Firm*—Luis M. Ortiz; Kermit D. Lopez

(57) ABSTRACT

A thermal sensor includes a die having a surface formed to accept the outer surface of tubing; a molded plastic part located on the die surface, said molded plastic part including flexible portions having a surface adapted to engage the bottom half of the circumference of standard tubing when the tubing is fully placed in the molded plastic part; conductive material selectively patterned on the surface of the flexible portions that engages the die surface; and retaining hardware adapted to secure the tubing against the molded plastic part and flexible portions when the retaining hardware is secured to the molded plastic part.

11 Claims, 3 Drawing Sheets

TUBE AND DIE INTERFACE FOR LIQUID FLOW SENSING THROUGH THE TUBE

TECHNICAL FIELD

Flow Sensor, Tube to Die Interface, Tube to Chip Interface, Isolated Liquid Flow Sensor

BACKGROUND

Thermal sensing of liquid through the wall of standard tubing is generally impeded by the amount of surface contact between the tube and the sensing die. If thermal properties of liquid could be accurately sensed through the tubing, then the flow of liquid as it is passing through standard tubing could also be sensed. Physical contact between tubes and sensors is not typically much more than the point or line of contact where the outer radius of the tubing diameter contacts the flat surface of a die adapted with thermal a sensor.

Thermal flow sensors rely on the change in tubing wall temperature to sense the amount of flow through the tubing. To enhance sensitivity of a thermal flow sensor, it would be beneficial if more area of the standard tubing were in thermal contact with the sensing die.

SUMMARY OF EMBODIMENTS

In accordance with a unique feature, the present invention increases the area of contact on the tubing wall and establishes separate thermally conductive paths between the increased contact area and the sensing areas of the die.

In accordance with another feature, the invention provides more contact area and a precise clamping force between the flow sensor and the tube, tubing can be removed and replaced after initial manufacture of the device.

In accordance with another feature, a thermal sensor is provided that includes a die having a surface formed to accept the outer surface of tubing; a molded plastic part located on the die surface, said molded plastic part including flexible portions having a surface adapted to engage the bottom half of the circumference of standard tubing when the tubing is fully placed in the molded plastic part; conductive material selectively patterned on the surface of the flexible portions that engages the die surface; and retaining hardware adapted to secure the tubing against the molded plastic part and flexible portions when the retaining hardware is secured to the molded plastic part.

In accordance with other features, a thermal sensing device is described that includes a C-clamp-like thermal sensor formed from a die material and provided in the form of a C-clamp, said C-clamp-like thermal sensor adapted to receive tubing when an opening formed when the c-clamp-like thermal sensor is opened and substantially surrounding the tubing when the C-clamp-like thermal sensor is closed over the tubing. A ribbon cable coupled to the die material opposite the opening formed when the C-clamp-like thermal sensor is opened. Metal connections integrated on the inner surface of the C-clamp-like thermal sensor to enhance thermal conduction of the C-clamp-like sensor when it is in contact with tubing.

DETAIL DESCRIPTION OF THE EMBODIMENTS

Figure 1:
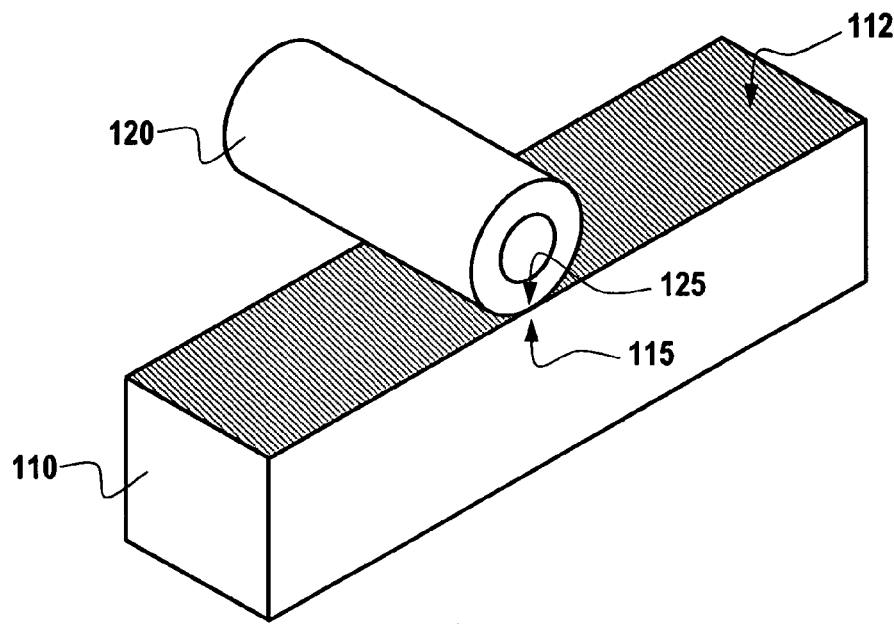
FIG. 1, labeled as "prior art", illustrated contact between the outer radius of standard tubing and a thermal sensor.

Referring to FIG. 1, which is labeled as "prior art", a perspective drawing of a thermal sensor 110 in contact with standard liquid tubing 120 is shown. The thermal sensor 110 has generally been provided in the form of a cube-shaped die. Only a small portion of the outer radius of the tubing diameter 125 is actually in physical contact with the surface of the sensor 115, which limits the effectiveness of the sensor in sensing the thermal properties of liquid flowing through the tube by sensing temperature through the wall of standard tubing. Adequate temperature readings are generally impeded by the limited amount of surface contact between the tubing 120 and the sensor 110.

The present inventors believed the flow of liquid as it is passing through standard tubing could also be sensed if thermal properties of liquid could be accurately sensed through the tubing. By improving the amount of physical contact between tubes and sensors, the present inventors improved the overall effectiveness of thermal sensors when used with standard tubing. As described in the background, thermal flow sensors rely on the change in tubing wall temperature to sense the amount of flow through the tubing. To enhance sensitivity of a thermal flow sensor, the present inventors provide contact of thermal sensor with more area of the standard tubing.

Figure 2:
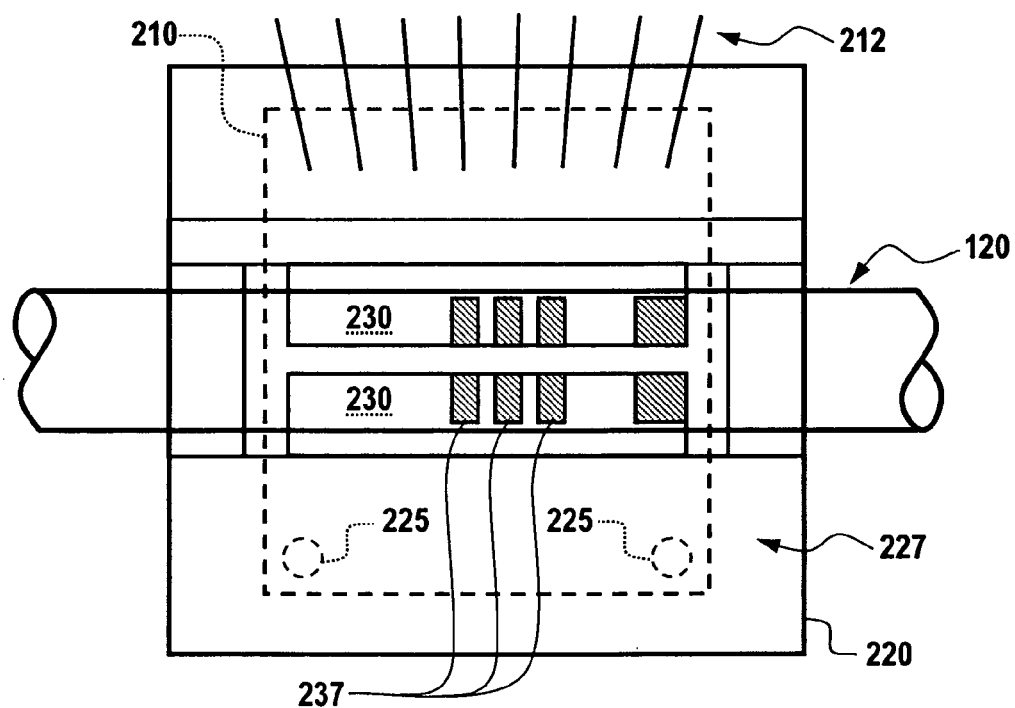
FIG. 2 illustrates a top view of a system in accordance with the embodiments wherein contact between the outer surface of standard tubing and improved thermal sensor is shown.
Figure 3:
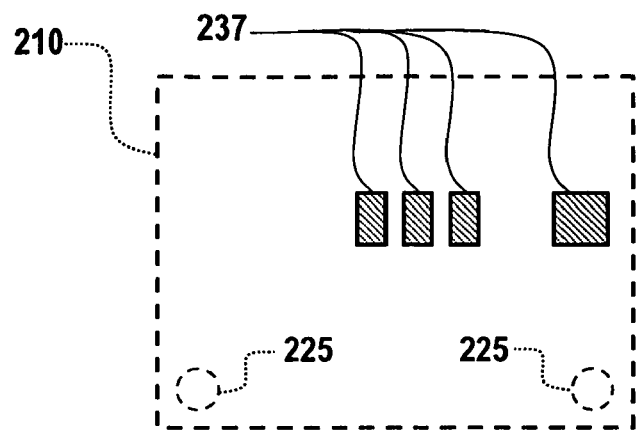
FIG. 3 illustrates a side view of the system shown in FIG. 2, wherein contact between the outer surface of standard tubing and another feature showing an improved thermal sensor in accordance with the embodiments, in accordance with additional features of the embodiments.

Referring to the top views of a sensor 200 according to features of the present invention shown in FIGS. 2 and 3, a molded plastic part 210 is precisely located on a die 220 by engaging two small dimples 215 on the molded part with two indentations 225 that are etched into the die's surface 227 at the wafer level. After location has been established, the molded plastic part 210 can be permanently fixed in position. The molded plastic part 210 has flexible portions 230 that engage the bottom half of the circumference of standard tubing 120, when the tubing 120 is fully placed in the sensor 200. On the surface of the flexible portions 230 of the molded plastic part 210 that engage the tubing 120, contacts 237 can be provided. The contacts 237 can be made of suitably conductive material such as high thermal conductivity ceramics (e.g., boron nitride, beryllium oxide and aluminum nitride), and metal (e.g., gold and silver). Where metal is used, the plating can be located on the flexible portions via selective plating processes. Wherein the plating is selectively plated on the back of the flexible portions 230 where they will engage the die's surface 227.

Figure 4:
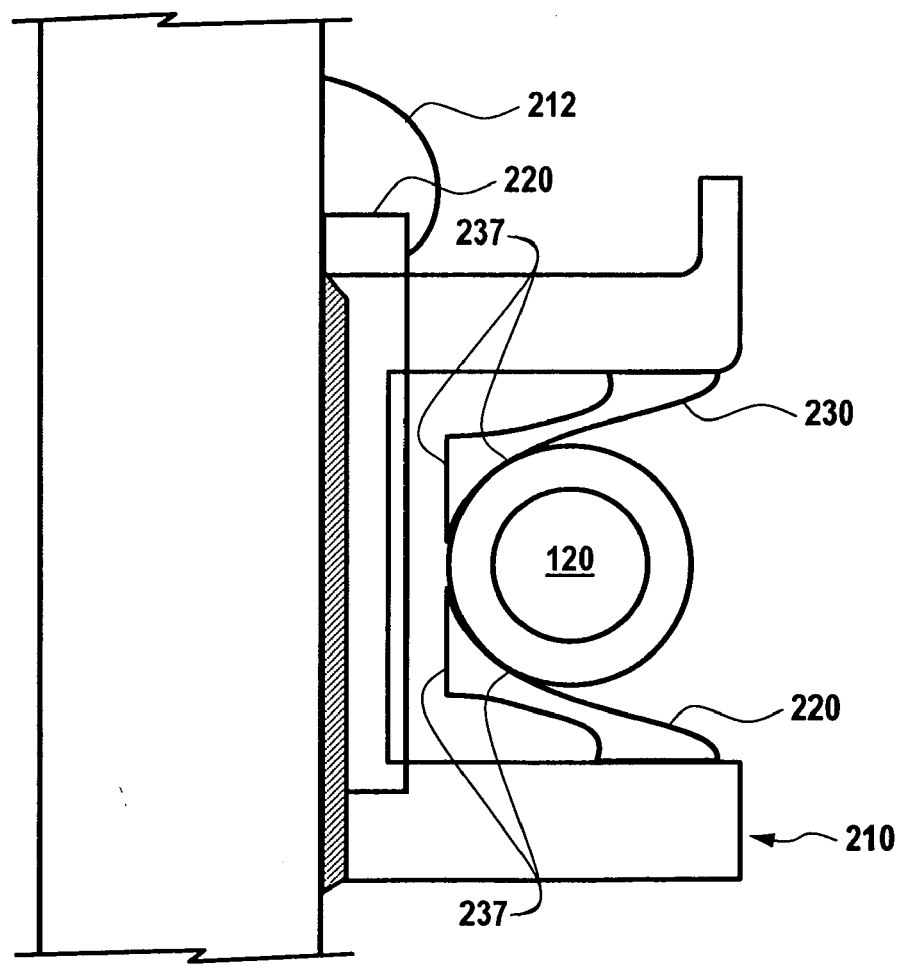
FIG. 4 illustrates the side view shown in FIG. 3 with a clamping part installed over the tubing held within the improved thermal sensor, in accordance with additional features of the embodiments.

Referring to the side view of FIG. 4, the thickness of the molded plastic part 210 is such that when the tubing 120 is fully engaged, the selectively plated flexible portions 230 on the molded plastic part 210 are deflected by the tubing 120 until both the flexible portions 230 and the tubing 120 make intimate contact with the die's surface 227. To enhance contact to the die 220, a suitable conductive material as described above can be plated/patterned/located on the die 220 at locations that are complimentary to the flexible portion 230 and/or tubing 120. An alternative to using selectively placed plating on the molded plastic part 210 is to use a thin pliable film (not shown) that has gold or another suitable conductive material patterned in the desired areas. The thin pliable film with the conductive pattern is placed on the molded plastic part 210 before the tubing 120 is placed within the sensor 200.

When the tubing 120 is in place, it forces the film comprising the molded plastic part 210 to conform to the circumference of the tubing and compresses it between the die surface 227 and the tubing wall 127. Location features on the molded plastic part 210 and the film 210 allow for precise positioning of the conductive pattern with respect to the die sensor 200 areas.

Figure 5:
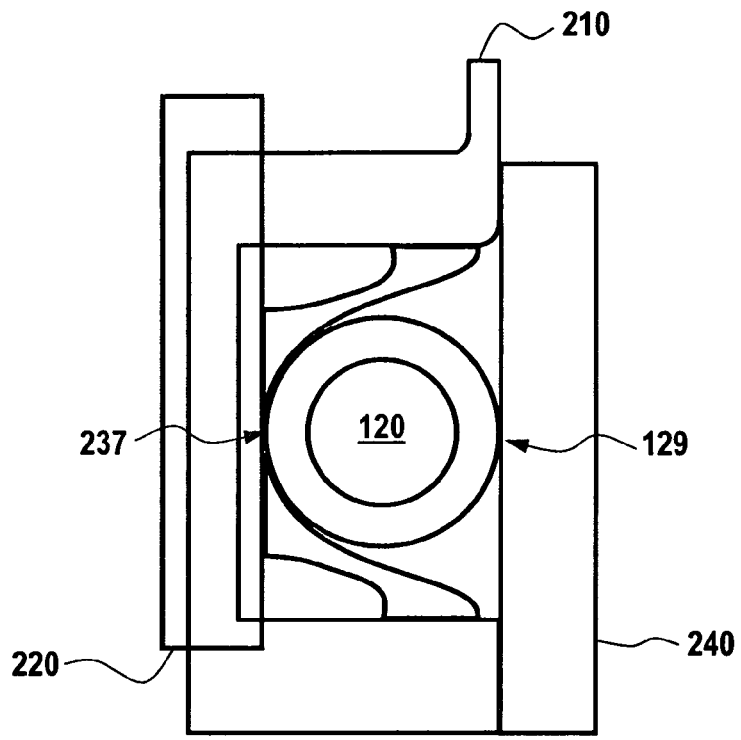
FIG. 5 illustrates a perspective view of tubing including metal rings and alignment rings formed or installed around the tubing's outer surface, in accordance with additional features of the embodiments.

Referring to the side view of FIG. 5, retaining hardware 240 can be used to clamp the tubing 120 against the die surface 227. Clamping can be accomplished by securing a flat surface 240 against a portion of the circumference of the tubing 129 exposed from the molded plastic part 210, which is also the area opposite the tubing's line of contact with the die surface 227. During assembly or installation, the flat surface 240 is pushed down against the tubing 120 until it the flat surface 240 engages the top of the molded plastic piece 210 that should already be permanently bonded in position on the die.

Figure 6:
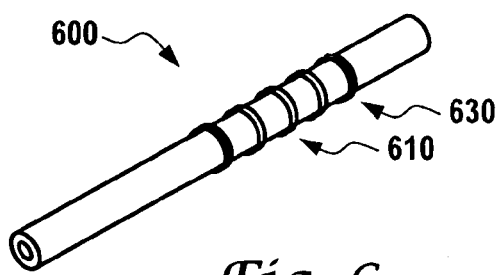
FIG. 6 illustrates a perspective view of an improved thermal clamp-like sensor including metal contact formed on the inner surface of the clamp-like sensor, in accordance with additional features of the embodiments.

In another embodiment shown in the perspective view shown in FIG. 6, thermally conductive rings 610 can be located on the outer surface of the tubing 620 to increase thermal contact area on the tubing 620 and to reduce thermal contact resistance. The thermally conductive rings can be made of suitably conductive materials (e.g. metals or ceramics) as described above. Alignment rings 630 can be placed on the tubing outside of metal rings 610 to help with alignment of the tubing 620 within the molded plastic part 210 of the sensor 200 shown in FIGS. 2 through 5.

Figure 7:
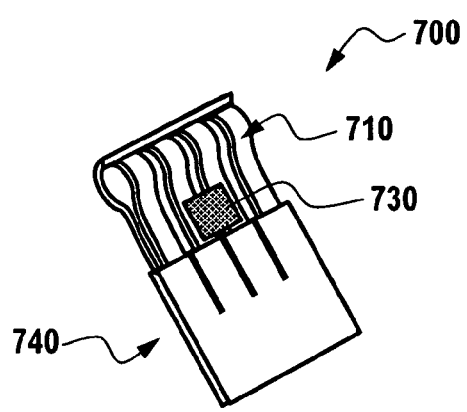
FIG. 7 illustrates a perspective view of an alternative sensor with a C-clamp-like sensor shown provided in the form of a C-clamp, which would open to receive the tubing, and substantially surround the tubing diameter when the clamp-like sensor is closed over the tubing and ribbon cable can be coupled to the die material forming the C-clamp-like sensor, in accordance with additional features of the embodiments.

Referring to the perspective view of FIG. 7, an alternative sensor design is shown. A C-clamp-like sensor 700 shown in FIG. 7 can be provided in the form of a C-clamp, which would open to receive the tubing 120/620, and substantially surround the tubing diameter when the clamp-like sensor 700 is closed over the tubing 120/620. Ribbon cable 740 can be coupled to the die material forming the C-clamp-like sensor 700. Integrated thermally conductive connections 710 can be placed on the inner surface of the C-clamp-like sensor 700 to enhance thermal operation. Where tubing 620 as shown in FIG. 6 is used with the C-clamp-like sensor 700, thermally conductive rings 610 formed on the tubing 620 to enhance heat transfer and reduce thermal resistance and variation can interface with the thermally conductive connections 610 formed on the inner surface of the clamp-like sensor 700. Furthermore, alignment rings 630 formed on the tubing 620 can assist with accurate alignment of the metal rings 610 and thermal contacts 710 when the tubing 620 is secured within the clamp-like sensor 700.

Conduction is heat transferred by means of molecular agitation within a material without any motion of the material as a whole. For heat transfer between two plane surfaces, such as in thermal liquid flow sensor applications, the rate of conduction heat transfer is $Q/t=kA(T2-T1)/d$, where:

$Q$=heat transferred in time=$t$ $k$=thermal conductivity of the barrier $A$=area $T$=temperature $d$=thickness of barrier Using metal or other thermally conductive material to make contact in between the tube 120/520 and sensor 200/700 can help reduce the thermal contact resistance because the material's contact properties will increase the contact area A due to deformation of metals and higher thermal conductivity of metals (Ag and Cu have 400 times higher thermal conductivities than that of glass).

Where metals are used, the thermal conductivity can be quite high, and those metals which are the best electrical conductors are also generally the best thermal conductors. At a given temperature, the thermal and electrical conductivities of metals are proportional. So thermal resistance can be introduced similarly to electrical resistance. Three (3) thermal resistors can be found in series where metal rings are used on tubing: the resistor of the liquid tube, Rt; the resistor due to contact, Rc; the resistor of the sensor die, Rd.

A sensor's sensitivity can be shown as a function of R, $S=f(R,x,y,z ...)$, $R=Rt+Rc+Rd$. The variation of sensor sensitivity due to movement of the tubing causes the change of Rc ($\delta$Rc), or the contact resistance change. The use of epoxy between tubing and a die keeps the Rc constant, so the result is stable performance. Without epoxy, $\delta$Rc and Rc are too big, and they contribute a lot of change to R and sensitivity.

For a disposable design, obviously, the biggest challenge is to keep Rc constant. Metal contact can be used to reduce Rc and $\delta$Rc, the result being a smaller $\delta$Rc and Rc over R.

The use of metal rings would reduce the Rc because $Rc=f(A, F ...)$, (A is contact area, F is force) metal is easier for deformation, Indium, soft gold (or Silver, etc) metal rings on both sides would increase contact area A, so it would reduce the Rc significantly.

Conforming coatings offer significant enhancement to the thermal contact conductance, with Indium exhibiting the most significant enhancement. In principle, the same result should be realizable with any conforming coating. Previous work with gold coating has shown that although the conductance was improved as the result of gold coating the surfaces, the improvement was nowhere near the magnitude of that realized with Indium. There are two reasons for this. Firstly, gold is still much harder than Indium. Secondly, the thickness of Indium was a lot higher than that of the gold. Where mass production and cost are factors, it is believed that thermally conductive ceramics will be used in greater numbers for sensor made as described herein.

The invention claimed is:

1. A thermal sensor comprising
   a die having a surface formed to accept the outer surface of tubing;
   a molded plastic part located on the die surface, said molded plastic part including flexible portions having a surface adapted to engage the bottom half of the circumference of standard tubing when the tubing is fully placed in the molded plastic part;
   conductive material selectively patterned on the surface of the flexible portions that engages the die surface; and
   retaining hardware adapted to secure the tubing against the molded plastic part and flexible portions when the retaining hardware is secured to the molded plastic part.

2. The sensor of claim 1 wherein the conductive material is comprised of at least one of: gold plating, silver plating, Indium plating or a thermally conductive ceramic.

3. The sensor of claim 1 wherein the molded plastic part is permanently located on a die by engaging two small dimples on the molded part with two indentations that are etched into the die's surface at wafer level.

4. The sensor of claim 1 wherein thickness of the molded plastic part is such that when the tubing is fully engaged, the flexible portions are deflected by the tubing until both the flexible portions and the tubing make intimate contact with the die surface.

5. The sensor of claim 1 wherein conductive material is patterned on the die surface at locations that are complimentary to conductive material patterned on the flexible portions to enhance contact between the flexible portions and the die.

6. The sensor of claim 1 wherein the retaining hardware further comprises a flat surface securable against a portion of the circumference of the tubing exposed from the molded plastic part and the molded plastic piece.

7. The sensor of claim 1 further comprising adaptation of the sensor for use with tubing having an outer surface and including thermally conductive rings formed on the outer surface of the tubing, said metal rings increasing thermal contact area on the tubing and to reduce thermal contact resistance.

8. The sensor of claim 7, said tubing further comprising alignment rings placed on the tubing outside of thermally conductive rings, said alignment rings enabling alignment of the tubing within the molded plastic part.

9. The sensor of claim 1 wherein the conductive material is comprised of at least one of: gold plating, silver plating, Indium plating or a thermally conductive ceramic.

10. A thermal sensor comprising a molded plastic part adapted to secure and enclose a portion of tubing, said molded plastic part including thermally conductive contacts formed therein having a surface adapted to engage at least half of the circumference of standard tubing when the tubing is fully placed in the molded plastic part.

11. The sensor of claim 10 wherein the conductive material is comprised of at least one of: gold plating, silver plating, Indium plating or a thermally conductive ceramic.

* * * * *